June 10, 1952     A. L. CHRISTIANSEN     2,599,694
FISH CUTTING AND CLEANING MACHINE
Filed July 5, 1947     2 SHEETS—SHEET 1
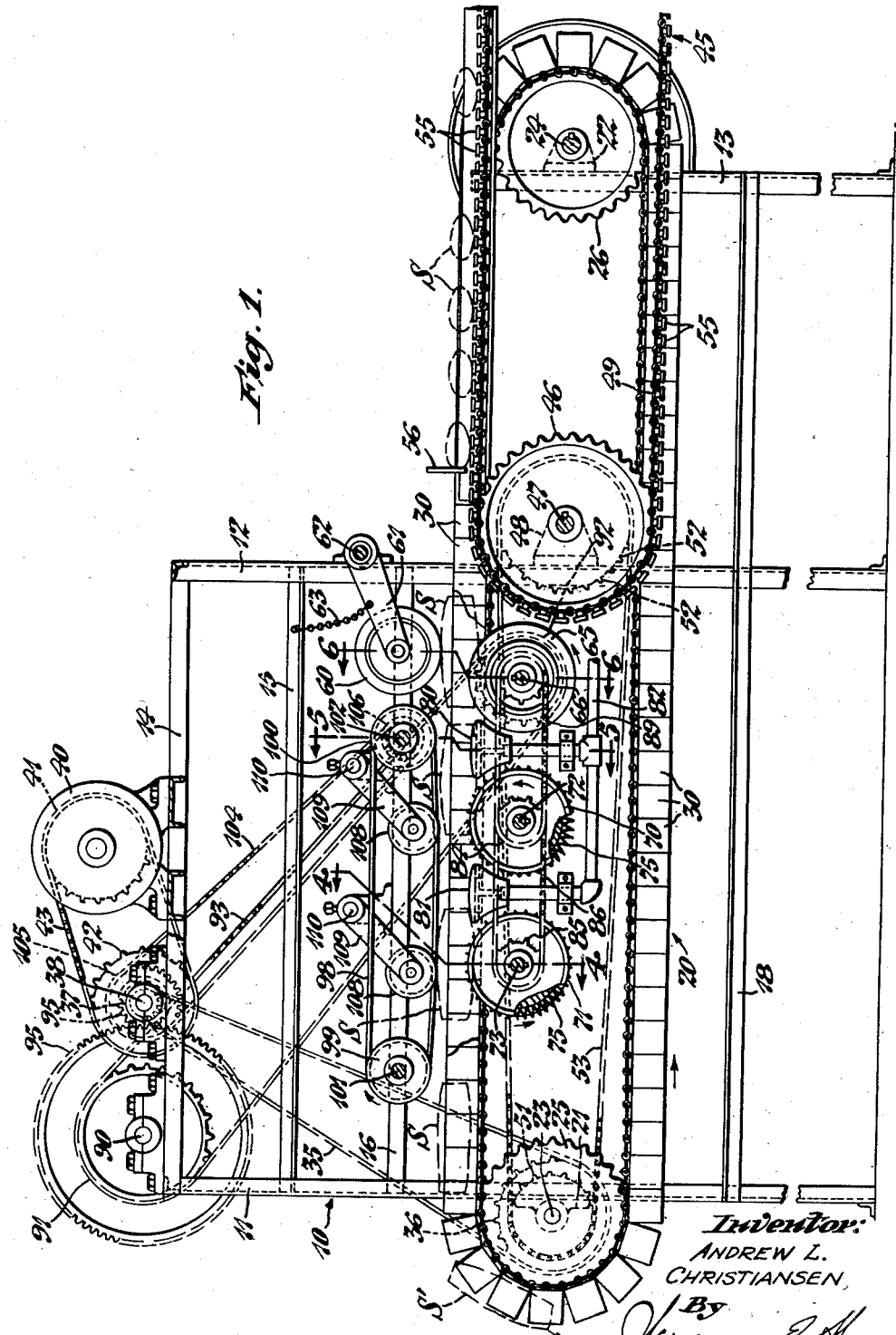
Inventor:
ANDREW L. CHRISTIANSEN
By William E. Hall
Attorney.

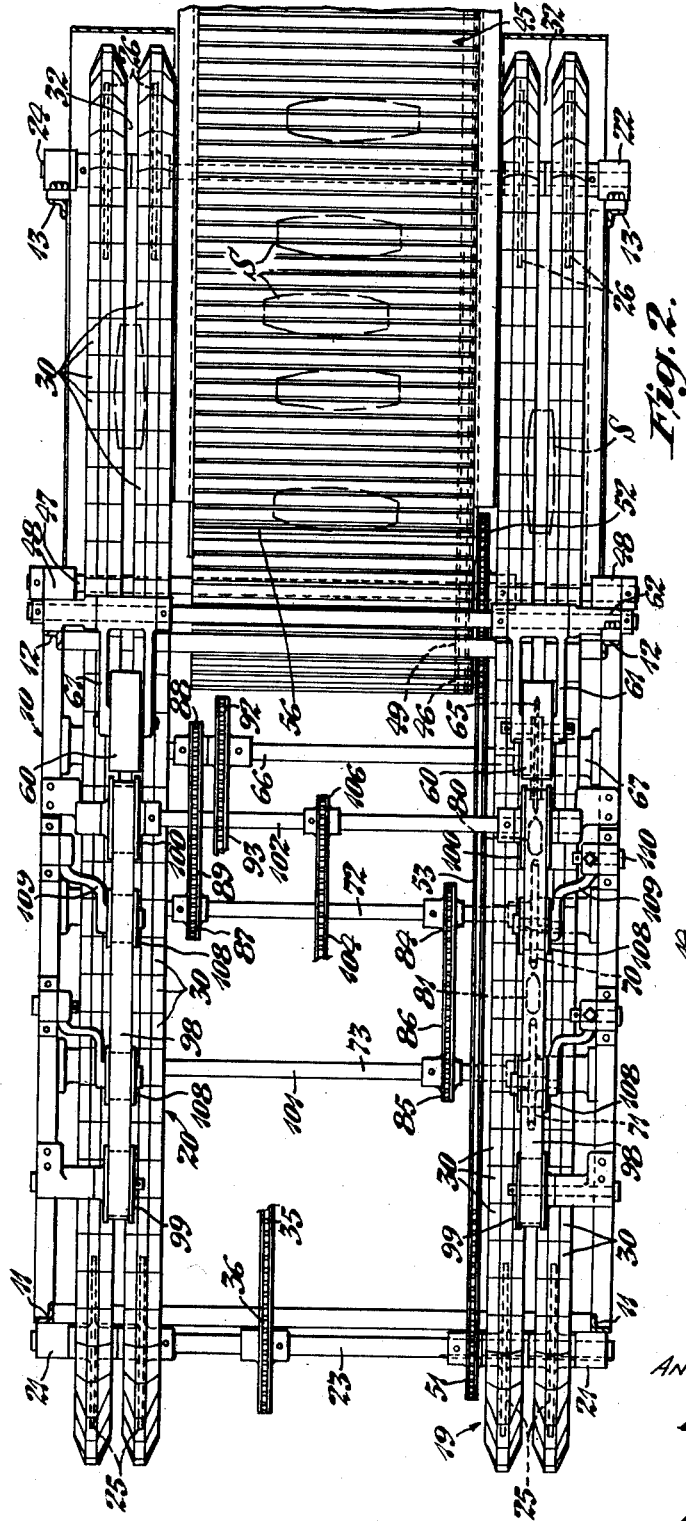

Patented June 10, 1952

2,599,694

UNITED STATES PATENT OFFICE 2,599,694

FISH CUTTING AND CLEANING MACHINE

Andrew L. Christiansen, Compton, Calif.

Application July 5, 1947, Serial No. 759,006

5 Claims. (Cl. 17—4)

My invention relates to fish cutting and cleaning machines used particularly in canning establishments for initially preparing fish for subsequent processing. The present improved fish machine is of the general type disclosed in United States Patent No. 2,166,939, entitled Fish Cutting and Cleaning Machine, granted to me on July 25, 1939, reference being made hereinafter to this patent.

In my prior patent, referred to above, the fish machine included means for removing the head and tail portions of the fish, means for splitting the bellies of the remaining center sections of the fish lengthwise, means for spreading the sides of the split bellies, and means for removing the entrails of the fish from the bellies. The present invention is concerned essentially with the means for splitting and removing the entrails of the fish, the heads and tails being removed in any suitable manner by means such as that disclosed in the above patent. In the patented machine, the fish sections are conveyed lengthwise with the bellies uppermost, and the rotary knife means and the rotary entrails-removing means are arranged above the conveyor so as to split and remove the entrails from the bellies of the fish. The splitting and cleaning means are pivotally mounted and gravity operated so that they penetrate the fish sections, the maximum extent of penetration being limited by adjustable stop means, in the form of chains. While such a machine is quite successful in operation, it has been determined that when the cutting and cleaning elements are adjusted for cleaning fish of predetermined size, fish sections, which vary slightly in size from the predetermined dimensions, are inadequately operated upon. For example, when an undersize fish section is conveyed under the cutting and cleaning elements, the latter will penetrate the upturned bellies to a lesser extent and therefore complete removal of the entrails is not attained. Conversely, when an oversize fish section travels through the machine, the splitting and cleaning elements may penetrate to an excessive degree. Moreover, it has been found that when the machine is constructed in accordance with the disclosure outlined in the patent and the washing or flushing means is disposed above the fish sections being cleaned, the sections are sometimes insufficiently washed, with the result that pieces of the entrails may remain in the prepared fish sections.

It is a primary object of the present invention to obviate the faults of previously used fish machines by providing a machine which is capable of completely removing the entrails from fish sections of somewhat varying sizes. This object is best accomplished by conveying the fish sections horizontally and lengthwise, the sections being arranged with their bellies lowermost so as to be operated upon by the belly-splitting and entrails-removing elements which are disposed below the path of movement of the fish sections. By this reverse arrangement of parts, the splitting and cleaning elements may be made stationary, that is, non-adjustable in a vertical direction, and the moving fish sections presented to these elements at the proper height to insure complete removal of the entrails while preventing removal of edible flesh.

It is another object in this respect to provide pressure means arranged above the conveyor means and operative to force the fish sections into proper engagement with the splitting and cleaning elements, so as to effect proper cleaning of the fish sections, regardless of the size of the latter, within prescribed limits.

It is another object of my invention to provide means for washing or flushing away the entrails removed from the fish sections, such flushing means being incorporated in the means for spreading the sides of the fish bellies and arranged below the path of travel of the fish sections, so that the entrails washed from the sections may fall directly therefrom, instead of traveling on the conveyor to a point remote from the cleaning elements.

Another object is to provide a conveyor of unique construction, capable of conveying the fish sections lengthwise across the revolving cutter and cleaning elements to be operated upon thereby. In a preferred embodiment, the conveyor consists of a pair of endless units arranged in relatively close side-by-side relationship and forming therebetween a longitudinal channel in which the fish sections are held and conveyed, the channel being open at its bottom so as to permit the cutter and cleaning elements to enter the channel to operate upon the fish sections.

A further object is to provide, in a machine of the class referred to, pressure means for forcing the fish sections down in the channel of the conveyor means, so that the bellies of the fish sections are properly positioned with respect to the splitting and cleaning elements.

A still further object is to provide a machine of the type indicated which is comparatively simple in construction, economical to operate, and one which is highly efficient in performing its intended function.

Further objects of the invention are set forth in the following specification, which describes a preferred embodiment of the machine, by way of example, as illustrated by the accompanying drawings. In the drawings:

Fig. 1 is a longitudinal sectional view through a fish cleaning machine constructed in accordance with my invention;

Fig. 2 is a plan view of the machine with the upper portion removed to disclose the splitting and cleaning mechanism;

Fig. 3 is a plan view, in reduced scale, showing the driving means for operating the various elements; and, Figs. 4, 5, and 6, are cross-sectional views, taken, respectively, on lines 4—4, 5—5, and 6—6 of Fig. 1.

Referring to the drawings in detail, my improved fish cleaning machine includes a framework 10 having upright members 11, 12, and 13, and horizontal members 14, 15, 16, 17, and 18, for supporting the various mechanisms. The machine also includes a pair of laterally spaced conveyors 19 and 20 arranged adjacent and movable along the sides of the machine (Fig. 2). Since the conveyors 19 and 20 are identical in construction, only one will be described in detail.

Rotatable in bearing brackets 21 and 22 carried by the uprights 11 and 13 are transverse shafts 23 and 24, respectively. The shaft 23 carries two pairs of relatively large sprockets 25, one pair of sprockets being disposed at each side of the machine framework. Carried by the shaft 24 are two pairs of similar sprockets 26, the sprockets 25 and 26 being adapted to support and rotate endless chains 28, forming part of the conveyors 19 and 20, therebetween. Thus, the chains 28 are adapted to be moved through a vertical closed path extending lengthwise of the machine. Each chain linkage carries a plurality of sheet metal holder elements 30 arranged in end-to-end abutting relation throughout the lengths of the chains so that an articulated structure is provided to enable the elements to tilt, one with respect to another, when passing around the sprockets 25 and 26.

The series of chain links 28 and elements 30 of each conveyor 19 and 20 are spaced laterally at a suitable distance apart, see Fig. 4, and the facing sides of the holder elements 30 have sloping sides so that each conveyor is provided with a longitudinally extending channel 32 in which the fish sections are held during their travel through the machine. The channel has an open bottom through which the splitting and cleaning elements extend to operate upon the fish sections being conveyed, see Figs. 4 and 6.

The shaft 23 is rotated by a chain 35 passing around a sprocket 36 on the shaft and a second sprocket 37 fast on a first drive-shaft 38 rotatable at the top of the machine framework 10. The drive-shaft 38 is rotated from an electric motor 40 by means of sprockets 41 and 42 and a chain 43, see Figs. 1 and 3. It is apparent that when the shaft 23 is rotated, its several sprockets 25 act to drive the chains 28 to cause the conveyors 19 and 20 to travel lengthwise of the machine.

It has been stated that the present machine is concerned only with mechanism for removing the entrails of fish. For this reason, the head and tail portions of the fish may be removed either manually or mechanically at another location and the remaining center sections of the fish subsequently operated upon in the present machine.

It has been found advantageous to deliver the fish sections to the cleaning machine at a rate commensurate with the rate of feeding the fish through the cleaning machine, and this may be accomplished by means of a conveyor unit 45. As herein shown, the conveyor unit 45 includes a pair of spaced sprockets 46 carried by a transverse shaft 47 rotatable in bearing brackets 48 attached to the uprights 12, and conveyor chains 49 surrounding the sprockets. The chains also pass around similar sprockets (not shown) located at a point remote from the fish cleaning machine. The shaft 47 is driven from the shaft 23 by means of sprockets 51 and 52 and a chain 53, the ratio of the sprockets being such that the conveyor unit 45 is driven at a slower rate of travel than that of the conveyors 19 and 20. The conveyor unit 45 is of less width than the space between the conveyors 19 and 20 to adapt it to fit therebetween, as shown in Fig. 2. Extending between the links of the opposite chains 49 are cross-members or slats 55 for supporting the fish sections S which are placed on and transported by the conveyor unit, as shown in Fig. 2. By this arrangement, the fish sections S are delivered to the cleaning machine at a rate to keep the conveyors 19 and 20 supplied. Upon approaching the cleaning machine, the fish sections S are removed from the conveyor unit 45, by attendants standing at the sides of the unit, and placed on the traveling conveyors 19 and 20 with their bellies lowermost. An abutment or backstop 56 is provided for preventing the fish sections from riding beyond the inner end of the conveyor unit 45.

Upon entering the main part of the fish cleaning machine, the fish sections S are pressed down into the channels 32 of the conveyors 19 and 20 by means of wheels 60. The wheels 60 are rotatable at the end of arms 61, pivoted at 62 to the upright 12. The combined weight of each wheel 60 and its supporting arm 61 is sufficient to cause each wheel to exert a downward thrust against the fish sections passing therebeneath, so as to force the sections down in the channels 32 to dispose their belly portions at a predetermined location with respect to the open bottoms of the conveyors 19 and 20, the wheels being restrained from excessive downward movement into the channels 32 when no fish sections are beneath the wheels and such restraint is effected by chains 63, see Fig. 1.

Immediately following their being forced down in the channels 32 of the conveyors 19 and 20, the fish sections S are split or slit longitudinally by means of rotatable circular knives 65 which are carried by a transverse shaft 66 arranged below the conveyors, the shaft being rotatable in bearing brackets 67 mounted on the side members 17 of the framework 10, see Fig. 6. As the fish sections are moved lengthwise of the machine, the disc-like knife blades 65 cut a slit longitudinally through their lower belly portions, as shown in Figs. 1 and 6. Since all fish sections are wedged down in the channels 32 to cause their lower extremities to substantially align with the lower open end of the channels, the knives 65 will cut into the fish the same amount.

After being slit by the knives 65, the fish sections S move to rotary cleaning wheels 70 and 71 which are arranged in tandem and which act to remove the entrails from their slit belly portions. The wheels 70 and 71 are carried by transverse shafts 72 and 73 rotatable in bearing brackets 74, and each wheel has a peripheral groove in which is disposed a helical spring 75. The springs 75 are stretched around the peripheries of the wheels 70 and 71 with their ends connected to retain them in place. As the wheels 70 and 71 are rotated, the convolutions of the springs 75 engage and withdraw the entrails from the bellies of the fish sections. In order to facilitate the entrance of the peripheries of the cleaning wheels 70 and 71 into the moving fish sections, spreader elements 80 and 81 are disposed in advance of the respective wheels 70 and 71, these elements being of such form that they enter the slits in the bottom of the fish sections and spread the sides of the bellies apart. The spreader elements 80 and 81 are connected to a pipe system 82 through which water flows to be emitted from nozzle openings in the elements, the water thus being directed against the lower sides or bellies of the fish sections to flush away the entrails as they are removed by the cleaning wheels 70 and 71. The forward spreader 80 may have only a rearwardly directed water passage and nozzle while the spreader 81 may have forwardly and rearwardly directed nozzles. It is thus seen that the removed entrails are adapted to be washed down through the open bottoms of the conveyors 19 and 20 and suitable containers (not shown) may be provided for receiving the same.

The shafts 72 and 73 are connected for unitary rotation by means of sprockets 84 and 85 and a chain 86, and the shaft 72 is driven from the shaft 66 by sprockets 87 and 88 and a chain 89. The shaft 66 is driven at a relatively fast rate from a second drive-shaft 90 at the top of the machine by means of sprockets 91 and 92 and a chain 93 (Figs. 1 and 3). The drive-shaft 90 is driven from the shaft 38 by means of meshing gears 95 and 96, as shown in Fig. 3. It is thus seen that all the mechanisms of the machine are driven from the single electric motor 40.

During the passage of the fish sections S across the cleaning wheels 70 and 71, endless belts 98 act to hold the sections down in the channels 32. The belts surround longitudinally spaced pulleys 99 and 100 which are carried by shafts 101 and 102, respectively, the shafts being rotatable in bearing brackets 103 at the sides of the framework 10 (Fig. 5). The shaft 101 is driven from the shaft 38 by means of a chain 104 passing around sprockets 105 and 106 on the respective shafts 38 and 101. The belts 98 are relatively slack to permit their lower portions to be flexed downwardly into engagement with the back portions of the fish sections S by means of small pulleys 108 rotatable at the free ends of arms 109. The arms 109 are adjustably secured to pins 110 held in brackets 111 at the sides of the framework 10 (Figs. 1, 2, and 4).

After being operated upon by the slitting knives and cleaning elements, the cleaned fish sections S are conveyed forwardly, and as they start to travel with the conveyors around the sprockets 25 they fall from the conveyors, as indicated at S' in Fig. 1. The cleaned fish sections may fall into a suitable receptacle or onto a conveyor (not shown) which may be used to transport them to another location for subsequent processing.

While I have herein shown and described the improved fish cleaning machine as embodied in a preferred form of construction, by way of example, it is to be understood that various modifications might be made in the construction and arrangement of its parts without departing from the spirit or scope of the invention.

Therefore, without limiting myself in this respect, I claim:

1. In a machine for cleaning fish: substantially horizontal conveyor means; knife means disposed below said conveyor means; spreader means disposed beneath said conveyor means; and cleaning means disposed below said conveyor means, said cleaning means including a rotary member, and a helical element surrounding the periphery of said member.

2. In a machine for cleaning fish: substantially horizontal conveyor means; knife means disposed below said conveyor means; spreader means disposed beneath said conveyor means; and cleaning means disposed below said conveyor means, said cleaning means including a rotary member having a peripheral groove, and a resilient helical element disposed in said groove.

3. In a machine for cleaning fish: substantially horizontal conveyor means having means defining a longitudinal channel, said channel having an open bottom; knife means disposed below said conveyor means and extending upwardly through said opening; stationary spreader means arranged below said conveyor means and extending upwardly into said channel, said spreader means including a shoe having a relatively pointed end; and rotary cleaning means disposed below said conveyor means.

4. A machine as defined in claim 3 in which said spreader shoe has a nozzle opening therein through which cleaning water can be directed.

5. A machine as defined in claim 4 which includes a pair of said rotary cleaning means spaced from each other and from said knife means in the direction of movement of the conveyor means, there being one of said spreader shoes disposed between said knife means and one of said cleaning means, and another of said spreader shoes disposed between said pair of said cleaning means.

ANDREW L. CHRISTIANSEN.

REFERENCES CITED

The following references are of record in the file of this patent:

UNITED STATES PATENTS

| Number | Name | Date |
|---|---|---|
| 2,166,939 | Christiansen | July 25, 1939 |
| 2,245,329 | Danielsson | June 10, 1941 |
| 2,263,696 | Grayson | Nov. 25, 1941 |
| 2,263,697 | Grayson | Nov. 25, 1941 |
| 2,345,607 | Kaplan | Apr. 4, 1944 |
| 2,455,675 | Hawk | Dec. 7, 1948 |